(No Model.) 3 Sheets—Sheet 1.
E. R. PROCTER.
CORN PLANTER.
No. 333,547. Patented Jan. 5, 1886.
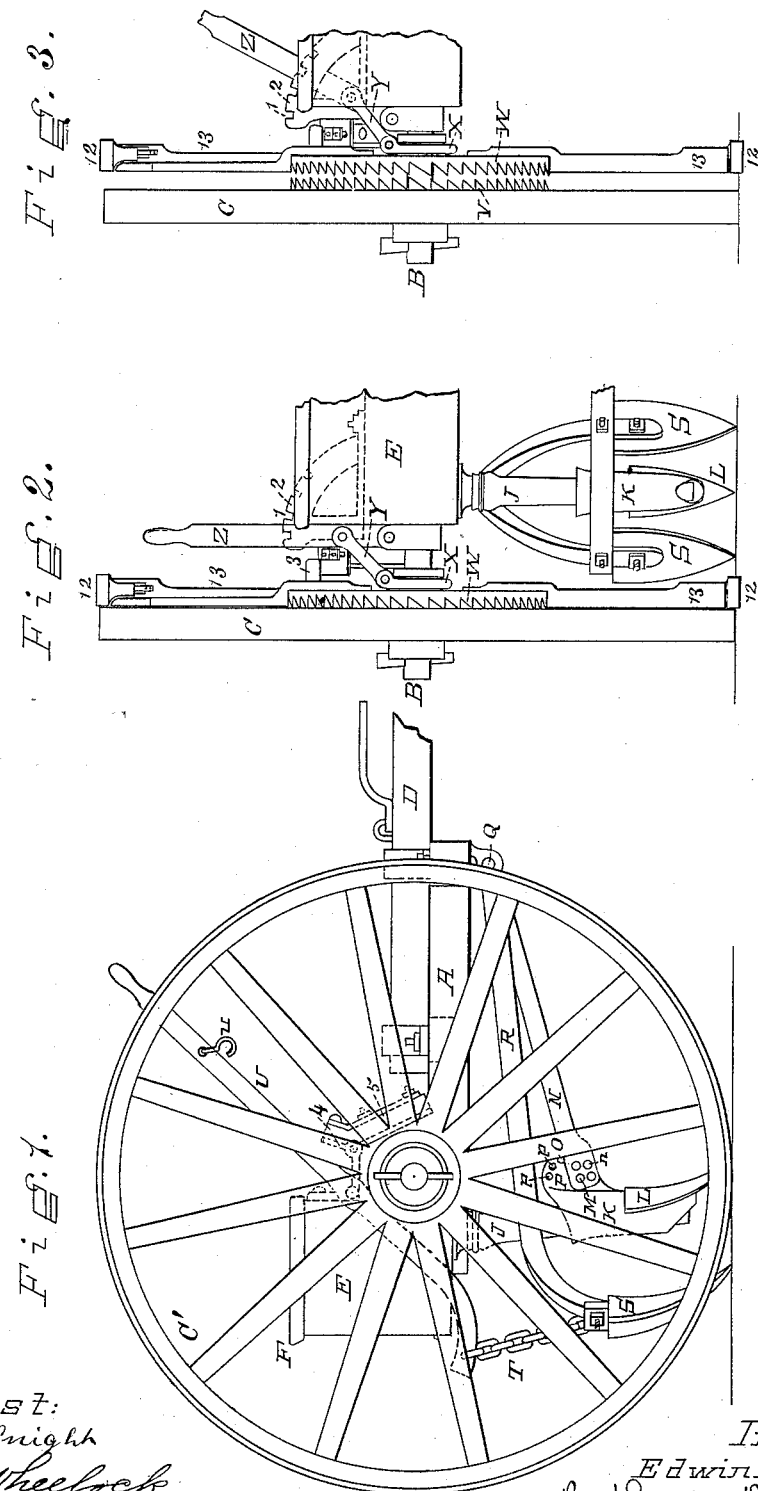
Attest:
A. P. Knight
Geo. L. Wheelock
Inventor:
Edwin R. Procter
By Knight Bros. Attys.

(No Model.)   3 Sheets—Sheet 2.
E. R. PROCTER.
CORN PLANTER.
No. 333,547.   Patented Jan. 5, 1886.
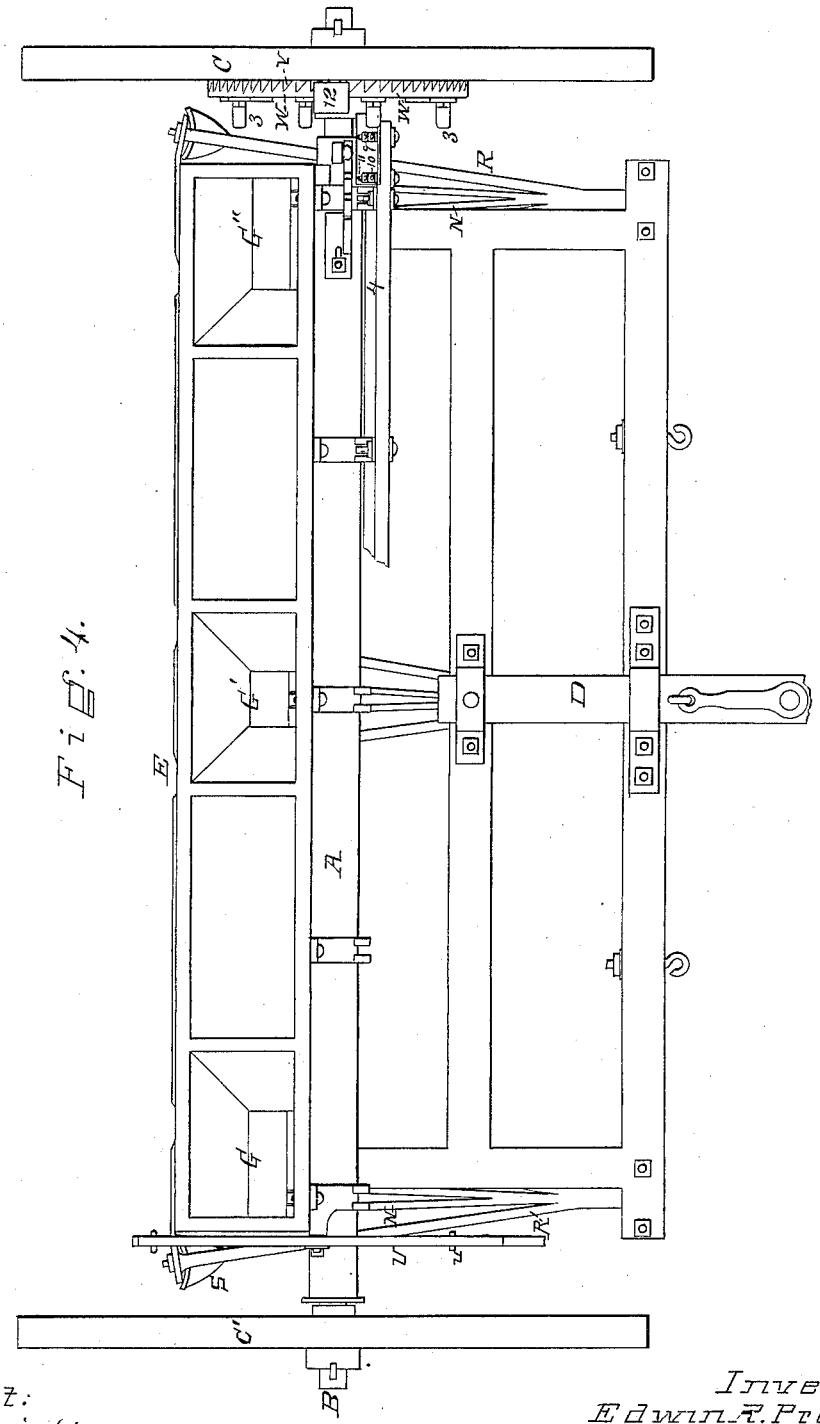
Attest:
A. P. Knight
Geo. L. Wheelock
Inventor:
Edwin R. Procter
By Knight Bros. Attys.

(No Model.) 3 Sheets—Sheet 3.
E. R. PROCTER.
CORN PLANTER.
No. 333,547. Patented Jan. 5, 1886.
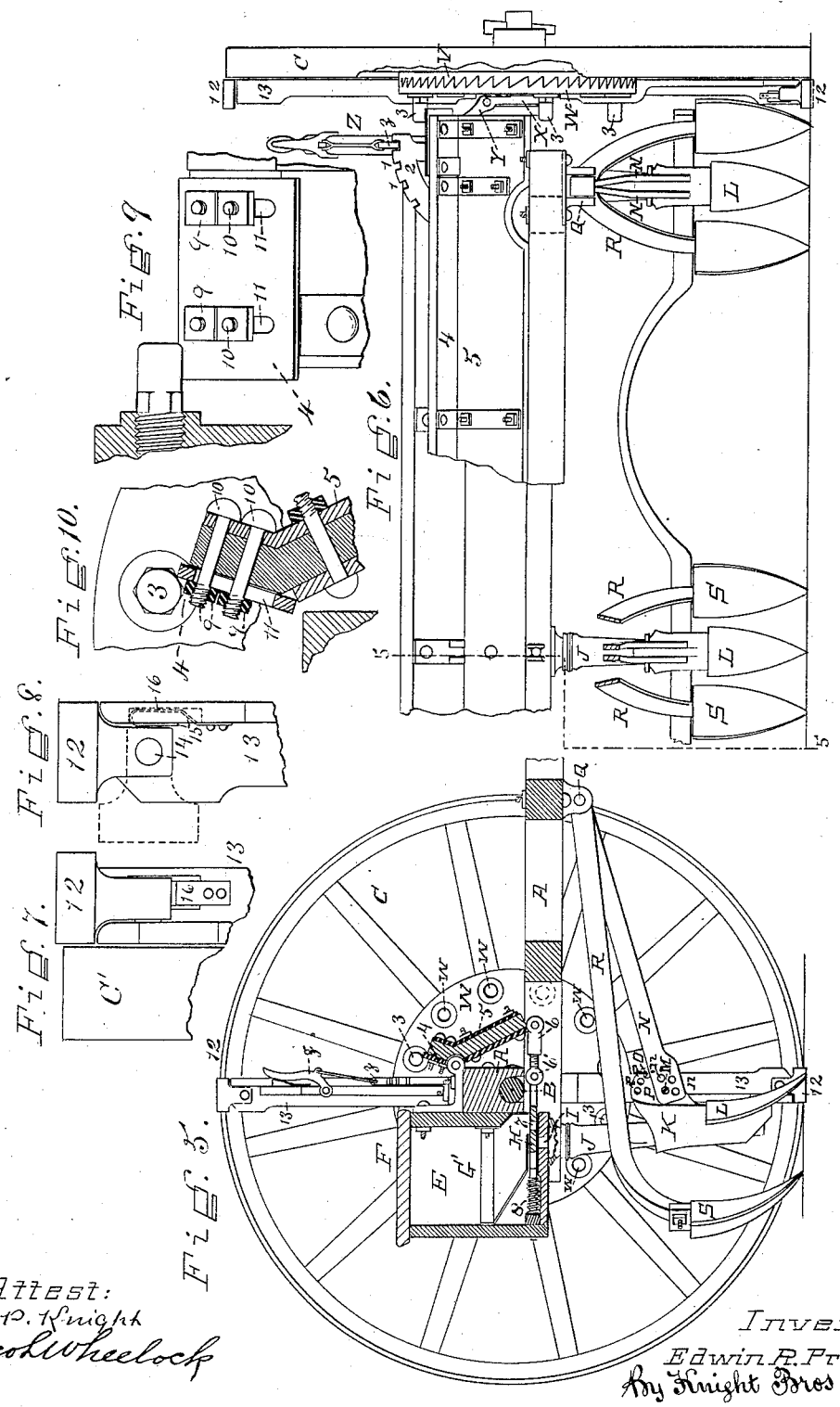
Attest:
C. P. Knight
Geo. L. Wheelock
Inventor:
Edwin R. Procter
By Knight Bros Attys.

UNITED STATES PATENT OFFICE.

EDWIN R. PROCTER, OF WASHINGTON COURT-HOUSE, OHIO.

CORN-PLANTER.

SPECIFICATION forming part of Letters Patent No. 333,547, dated January 5, 1886.

Application filed February 16, 1885. Serial No. 156,073. (No model.)

*To all whom it may concern:*

Be it known that I, EDWIN R. PROCTER, of Washington Court-House, Fayette county, Ohio, have invented a new and useful Improvement in Corn-Planters, of which the following is a specification.

My improvements are more particularly designed for what are known as "riding" or "sulky" corn-planters, such as are adapted to plant several rows simultaneously, either in "hills" or in "drills," and to be drawn over the ground by animal-power, the driver sitting upon the implement.

My machine is preferably arranged to drop three rows at one time by devices which connect the seed-delivery with projections upon a shiftable clutch-plate capable of being coupled to one of the ground-wheels.

Associated with the above is a novel arrangement of automatic markers and means whereby the ground-delivery is rendered capable of being adjusted to exact coincidence with the marking action.

In the accompanying drawings, Figure 1 is a side elevation of a corn-planter embodying my invention. Figs. 2 and 3 are rear elevations of my seed-delivery-operating clutch and tappet mechanism in its effective and non-effective conditions, respectively. Fig. 4 is a top view of the implement in working condition. Fig. 5 is a fore-and-aft section on the line 5 5. Fig. 6 is a front elevation of my seed delivery-operating-clutch and tappet mechanism in its effective condition, and of the parts of the machine thereto adjacent. Fig. 7 is a rear, and Fig. 8 is a side elevation, of the marker-foot. Fig. 9 is a rear, and Fig. 10 is a side elevation, of the lever and its actuating-tappet.

A may represent any suitable frame supported by customary axle, B, on two ground-wheels, C C', and provided with any suitable or customary means, D, for attachment of the draft-animals. The said frame A supports at its rear a suitable grain-box, E, which is closed, when the implement is in use, by a lid, F, that serves as a convenient seat for the driver.

In the preferred form of my implement said box has three equidistant grain-compartments, G G' G", having any suitable delivery-slides, H, which coact in the usual way with discharging orifices or ventages I, in the compartment-floors, whence the descending grain is conducted by spout J through boot K, attached in accustomed manner to rear of hoe L, whose wing P is coupled by pivot M to one of several holes, $n$, in drag-bar N. A wooden pin, O, in one of a series of holes, $p$, in wing P, co-operates with said drag-bar and pivot to hold the said hoe and the grain-delivery at the desired position in the line of draft. The same pivot Q that attaches the drag-bar N also attaches the beams R of a pair of covering shares or shovels, S, said beams and bar of each respective set being rigidly bolted or welded together, and each set provided with a chain, T, connected to a lever, U, conveniently accessible to the operator, which enables him to unearth any one or all of the sets. A hook, $u$, on this lever, being engaged in a chain or other object upon the frame, serves to maintain such set or sets in the elevated condition.

One of the ground-wheels, which may be the wheel C on the left side of the implement, has on its inner face a clutch-plate, V, with which is capable of being engaged a corresponding clutch-plate, W, which is sleeved upon the axle, and which is connected by yoke X and link Y to a lever, Z, convenient to the operator. Said lever Z has a latch, $z$, capable of engagement in one of a series of notches, 1, in a rack, 2, so as to hold the clutch-plate W either in or out of engagement with the clutch-plate V. The clutch-plate W has an annular series of equidistant holes, $w$, for attachment of any desired number of tappets, 3, at equal distances around said plate.

In the present illustration the parts are so proportioned that four tappets operate to discharge grain at the prescribed distance between consecutive hills for "hill-planting;" but provisions exist for attachment of thrice this number of tappets for use when it is desired to plant in drills. The tappets, in the course of revolution, strike (each in synchronous succession) the heel 4 of a bent lever, 5, whose other extremity is connected by link 6 to the grain-delivering slide H, having a suitable orifice, 7. The said slide is, except during its momentary shift, as aforesaid, maintained in the inoperative condition shown in Fig. 5 by the action of a helical spring, 8. The link 6 6' is composed of two parts, 6 6', having the represented screw-threaded attachment, so as to enable elongation or shortening of the said link and enable the slide to operate full open or partially open at the effective extremity of its stroke, as may be found desirable for the particular grain and the work to be accomplished. The heel 4 is also rendered capable of being set out or in at will by manipulation of the nuts 9 on bolts 10, occupying slots 11. This provision enables adjustment for wear, and also adds another means of regulation of the slide.

Besides the saving of time which a triple arrangement of seed-dropping mechanisms manifestly possesses over a single or double one, any lack of alignment in cross-cultivation is less abrupt and more easily followed by the cultivator.

To enable the operator to see where seed has been dropped, and by so doing bring the droppings of each successive through in alignment with those of its predecessor, I provide markers 12, preferably two in number, which, being diametrically opposite and dividing the circumference into two equal parts, serve, when employed for hill-planting, to indicate the places of the alternate hills. These markers, being attached by rods 13 to the clutch-plate W, revolve with said plate, and cease to revolve when said plate is unclutched from the ground-wheel and when, consequently, the seed-dropping operation is suspended. Each marker, being attached by pivot 14 to its rod, can be turned out of the way, as shown by dotted lines in Fig. 8, when not in use. A detent, 15, connected to rod 13 by its spring-shank 16, operates to retain such marker to either the operative or inoperative position.

I claim as new and of my invention—

1. In a seed or corn planter or grain-drilling machine, the combination, with the grain-compartments G G' G'', having their seed-dropping slides H hinged to extensible two-part links 6 6', of the ground-wheel C, having the fixed clutch-plate V, the axle B, the loose clutch-plate W, having tappets 3, and the rocking piece or lever 5, which communicates motion of the clutch-tappets through said links 6 6' to the said slides H, substantially as herein shown and described.

2. In a corn-planter or grain-drill, the combination, with the fixed axle B, bearing the slidable clutch-plate W, of the lever Z, frame fast upon said axle and to which said lever is secured, link Y, and yoke X, said lever having a latch, z, capable of engagement in one or more notches 1 of rack 2, whereby said clutch can, at the user's discretion, be readily thrown and held either into or out of gear with the fixed clutch-plate V upon the ground-wheel, substantially as described, and for the purposes stated.

3. The combination, with an axle and ground-wheel, of the clutch-plate V, secured to said ground-wheel, clutch-plate W, sliding on said axle and having annular series of holes w, tappets in said holes, grain-delivery slide, means connecting said tappets and said slide, yoke X, secured to said sliding clutch-plate, lever Z, having catch z, rack 2, having notches 1, and link Y, connecting said lever and said yoke, substantially as set forth.

4. The combination of loose clutch-plate W, the pivoted markers 12, and the spring-detents 15, as and for the purposes set forth.

5. In a corn-planter or grain-drill, the combination, with the grain-dropping slide H and the revolving tappets 3, of the rocker 5, having the adjustable heel 4, and the link 6 6', in two screw-threaded portions, as and for the purposes designated.

In testimony of which invention I hereunto set my hand.

EDWIN R. PROCTER.

Attest:
GEO. H. KNIGHT,
CHAS. E. PRIOR.